United States Patent [19]

Schwarz

[11] 4,251,585
[45] * Feb. 17, 1981

[54] PRODUCT AND PROCESS FOR STRETCHING A TUBULARLY FORMED SHEET OF ORIENTABLE THERMOPLASTIC MATERIAL

[75] Inventor: Eckhard C. A. Schwarz, Neenah, Wis.

[73] Assignee: Biax Fiberfilm Corporation, Neenah, Wis.

[*] Notice: The portion of the term of this patent subsequent to Sep. 26, 1995, has been disclaimed.

[21] Appl. No.: 901,523

[22] Filed: May 1, 1978

Related U.S. Application Data

[60] Continuation-in-part of Ser. No. 563,623, Mar. 31, 1975, abandoned, and a continuation-in-part of Ser. No. 614,018, Sep. 17, 1975, Pat. No. 4,116,892, Division of Ser. No. 766,926, Feb. 9, 1977, Pat. No. 4,144,008.

[51] Int. Cl.³ .................... B32B 1/08; B32B 31/02; B29D 7/24; B29D 23/04
[52] U.S. Cl. .................... 428/188; 156/229; 156/290; 264/209.3; 264/288.8; 264/563; 428/36; 428/101
[58] Field of Search .............. 264/288, 289, 210 R, 264/209, 563, 288.8; 156/229, 290; 428/36, 101, 188

[56] References Cited

U.S. PATENT DOCUMENTS

| | | | |
|---|---|---|---|
| 2,773,285 | 12/1956 | Piazzi et al. | 264/209 |
| 3,048,895 | 8/1962 | Bottomley | 264/210 R |
| 3,257,488 | 6/1966 | Rasmussen | 264/289 |
| 3,849,526 | 11/1974 | Muller et al. | 264/286 |
| 3,884,748 | 5/1975 | Andersen | 264/289 |
| 4,058,582 | 11/1977 | Bierenbaum et al. | 264/288 |
| 4,116,892 | 9/1978 | Schwarz | 264/288 |

FOREIGN PATENT DOCUMENTS 47-36015  9/1972  Japan ........................ 264/289

*Primary Examiner*—James B. Lowe
*Attorney, Agent, or Firm*—Louis E. Marn; Elliot M. Olstein

[57] ABSTRACT

There is described a process for bi-axially stretching a tubularly-formed sheet of thermoplastic material in first and second stations wherein the first and second stations are provided with sets of rolls having generally sinosoidally-shaped grooves perpendicular and parallel, respectively, to the axis of each set of rolls to produce bags of improved strip tensile breaking strength.

9 Claims, 2 Drawing Figures

PRODUCT AND PROCESS FOR STRETCHING A TUBULARLY FORMED SHEET OF ORIENTABLE THERMOPLASTIC MATERIAL

This application is a continuation-in-part application of applications Ser. No. 563,623 filed Mar. 31, 1975, now abandoned, and Ser. No. 614,018, filed Sept. 17, 1975, now U.S. Pat. No. 4,116,892, and a divisional application of application Ser. No. 766,926 filed Feb. 9, 1977 now U.S. Pat. No. 4,144,008.

This invention relates to a novel process and apparatus for the stretching of a tubularly-formed sheet of thermoplastic material and more particularly to a novel process and apparatus for the bi-axial stretching of a tubularly-formed sheet of orientable, polymeric thermoplastic material to form bags of improved strip tensile breaking strength.

BACKGROUND OF THE INVENTION

Theromplastic bags for diverse use, such as sandwich bags, garbage bags, leaf bags and the like, are produced by extruding a tube of thermoplastic material, such as high density polyethylene, with the resulting tubularly-formed material being cooled, heat sealed and either scored or cut to the desired length. The thus formed bag exhibits a strip tensile breaking length representative of the processed thermoplastic material. The end use of the thermoplastic bag normally dictates the selection of the thermoplastic material, e.g. as a sandwich bag, a low porosity and normal strength thermoplastic material is selected whereas a garbage bag would require the selection of a thermoplastic material exhibiting high strength characteristics.

OBJECTS OF THE INVENTION

It is an object of the present invention to provide a novel process and apparatus for stretching a tubularly-formed sheet of a synthetic material.

Another object of the present invention is to provide a novel process and apparatus for bi-axially stretching a tubularly-formed sheet or web of thermoplastic material to form a bag having an improved strip tensile breaking strength of at least twice that of the tubularly-formed sheet of thermoplastic material being treated.

Various other objects and advantages of the present invention will become apparent from the following detailed description of an exemplary embodiment thereof with the novel features thereof being particularly pointed out in the appended claims.

SUMMARY OF THE INVENTION

In accordance with the present invention, there is provided a process and apparatus for selective stretching a tubularly-formed sheet or web of thermoplastic material in a station provided with a set of grooved, generally sinosoidally-shaped rolls, whereby the sheet or web of thermoplastic material is stretched in a manner to affect uniform stretching thereby producing a sheet or web of larger dimension in the direction of stretch.

In accordance with a preferred embodiment of the present invention, there is provided a process and apparatus of bi-axially stretching a tubularly-formed sheet of thermoplastic material in a first station and a plurality of second stations wherein the first and second stations are provided with sets of rolls having grooves perpendicular and parallel, respectively, to the axis of each set of rolls. The groove pattern of each set of rolls is such that the distance between grooves is less than 1.0 millimeters times the sheet or web basis weight in grams per square meter. The sheet or web of tubularly-formed thermoplastic material is stretched in a manner to affect uniform stretching to produce a thermoplastic bag of substantially improved strip tensile breaking strength.

BRIEF DESCRIPTION OF THE DRAWING

The invention will be more clearly understood by reference to the following detailed description of an exemplary embodiment thereof in conjunction with the accompanying drawings wherein.

DETAILED DESCRIPTION OF THE INVENTION

Drive and support assemblies, timing and safety circuits and the like known and used by those skilled in the art have been omitted in the interest of clarity.

Figure 1:
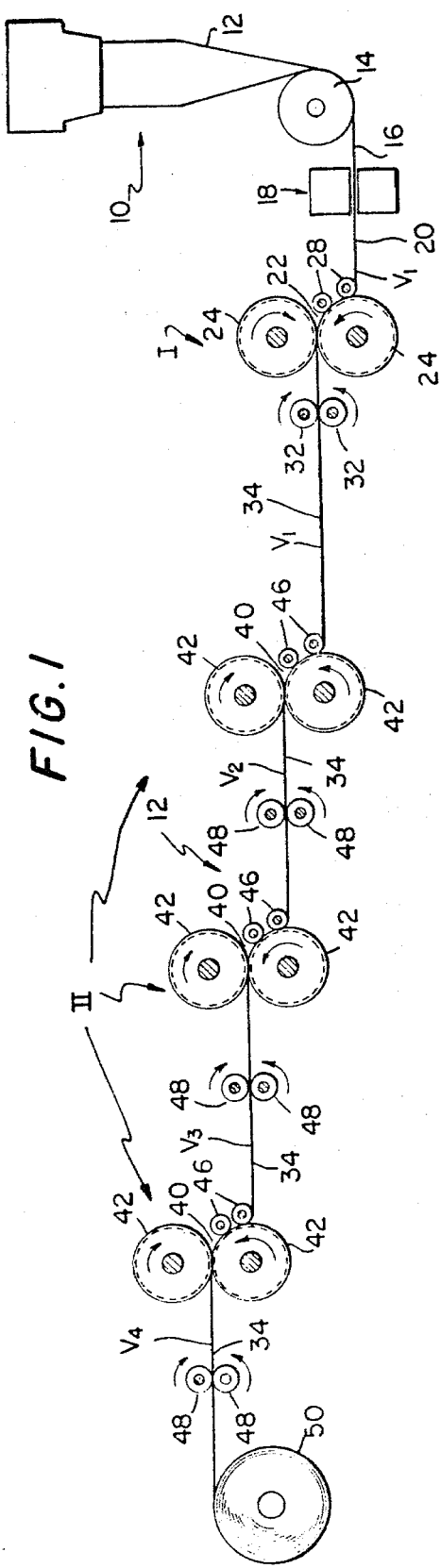
FIG. 1 is a schematic side elevational view of the apparatus and process of the present invention.

Referring to FIG. 1, there is illustrated a preferred embodiment of the process and apparatus of the present invention including a circular blown film dye assembly and a stretching assembly, generally indicated as 10 and 12, respectively. The circular blown film dye assembly 10 forming the blown film 12 may be any one of the types of assemblies sold by the Sterling Extruder Corportion of South Plainfield, New Jersey. The blown film 12 is passed about the roller 14 to form a flat two layered sheet 16 prior to introduction into the heat sealing assembly, generally indicated as 18, as known and used by those skilled in the art, wherein the two layered sheet is heat sealed at selected intervals on a line perpendicular to the movement of the sheet 16.

Figure 2:
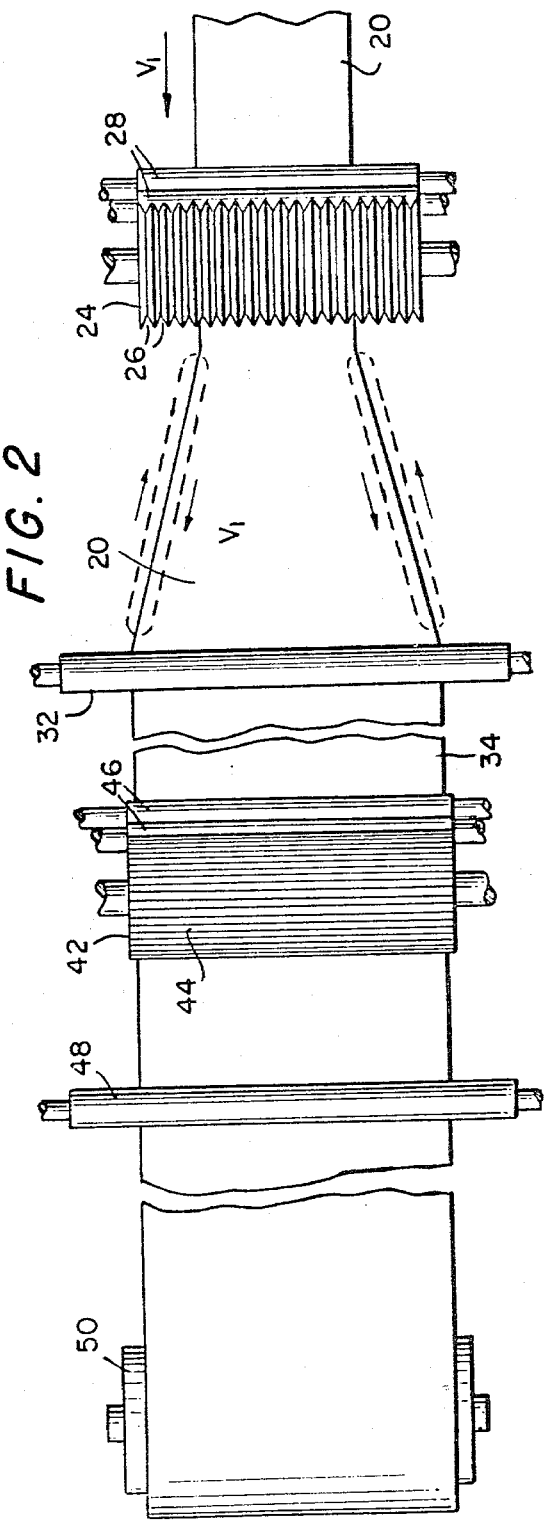
FIG. 2 is a schematic top elevational view of the apparatus and process of the present invention.

The thus heat-sealed, two-layered sheet 20 is coursed in a first station, generally indicated as "I" between a nip 22 of a pair of rollers 24 having a plurality of grooves 26 perpendicularly formed to the axis of the rollers 24, as seen in FIG. 2. The sheet 20 is maintained against the lower grooved roller 24 by a pair of press rollers 28 to hold the sheet 20 against the lower roller 28 to thereby prevent the sheet 20 form narrowing prior to introduction. Once in the nip 22, the sheet 20 assumes the shape of the groove pattern and becomes stretched by a factor of the draw ratio as herinafter more clearly described.

In the first station, i.e. lateral stretching, the sheet 20 is wound up at about the same velocity as the feed velocity. The crimp pattern is flattened out by stretching the sheet 20 laterally, such as by means of tenter clamps or curved Mount Hope rolls, generally indicated as 32, such as known and used by one skilled in the art.

The grooves 26 of the rollers 24 are intermeshed like gears, as known to those skilled in the art. As the sheet 20 enters the nip 22, the sheet 20 assumes the shape of a groove 26 and is stretched by a factor determined by the length of the sinus wave "l" of the groove divided by the original length of the web "ω" between contact points of each respective groove tip as disclosed in the copending application Ser. No. 563,623, filed Mar. 31, 1975, now abandoned.

The draw ratio $l/\omega$ is calculated by the following equation where $a = \pi d/2\omega$, and the sinus wave of the groove is $$l/w = \int_o^\pi \sqrt{1 + a^2 \cos^2 x} \, dx \div \pi$$

Thus for $d/\omega$ ratios of 1.0, 0.75 and 0.5 the draw ratios are 2.35, 2.0 and 1.6, respectively.

A laterally stretch sheet 34 is passed from the rollers 32 and is coursed between a nip 40 of a first pair of rollers 42 of a second station "II" with said rollers 42 having a plurality of grooves 44 parallel to the axis of the rollers 42. The sheet 32 is maintained against the lower grooved roller 42 by a pair of press rollers 46 to ensure that the velocity $V_1$ of the sheet 32 is substantially identical to the surface velocity $V_1$ of the grooved rollers 42. The grooves 44 of the rollers 42 are intermeshed like gears, as known to those skilled in the art. As the sheet 34 enters the nip 40, the sheet 34 assumes the shape of a groove 44 and is stretched by a factor determined by the length of the sinus wave "l" of the groove divided by the original length of the web "$\omega$" between contact points of each respective groove tip, as hereinabove discussed with reference to the passage sheet 20 through station I rollers 24.

The sheet 34 after passage through the nip 40 of the rollers 42 is pulled away by a pair of tension rollers 48 having a surface velocity $V_2$ greater than the surface velocity of the rollers 42, but no greater than a factor of the draw ratio affected in the nip 40 of the rollers 42.

Accordingly, the length of the sheet 34 is therefore increased by such factor. It is noted that the sheet 34 does not undergo narrowing while being longitudinally stretched or extended, as is the case with conventional roller systems. In a preferred embodiment of the present invention, the sheet 34 is passed through two further pairs of grooved rollers 42 to further stretch lengthwise the sheet 34 which is eventually collected on a roller 50.

The maximum permissible draw ratio can easily be determined by measuring the residual elongation of the thermoplastic material. For best results, the grooves 44 of the rollers 42 should be as fine as possible, with groove distance being increased, if heavy basis weight factors are to be oriented. For experience, good results are obtained, if the distance between grooves (in mm) is less than 1.0 times the fabric basis weight (in gram/m$^2$). With the process and apparatus of the present invention, a bag is produced having a much higher strip tensile breaking length (STBL - expressed as meters) than a normal produced blown film bag.

EXAMPLES OF THE INVENTION

Operation of the process and apparatus is described in the following examples which are intended to be merely illustrative and the invention is not to be regarded as limited thereto.

EXAMPLE I

A 7"×7" double layer sheet is formed by extruding a mixture of 90% polypropylene (melt flow rate of 0.5 g/mm) and 10% clay and had the following properties:
 thickness 0.050": 127 micron
 film basis weight: 125 g/m$^2$
 STBL: 3570 m
 break elongation: 1600%
 initial modulus: 1600 mm
 STBL over seal: 2560 m
 STBL over fold: 3050 m
The bag was heat-scaled and stretched in the apparatus 1.5 times on a lateral direction and 3.3 times on a longitudinal direction (3 passes) to a final dimension of 10.5" wide and 23" long. It was noted that the heat-scaled area also stretched. The stretched bag had the following properties:
 STBL: 23550 m
 break elongation: 40%
 initial modulus: 185500 m
 STBL over seal: 15500 m
 STBL over fold: 16600 m

EXAMPLE II

The process of Example I was repeated on a similar 7"×7" sheet with heat sealing being effected after stretching vice before with the STBL over seal being 2200 m; i.e. less than the STBL over seal of a bag heat sealed before stretching.

EXAMPLE III

A 7"×7" double layer sheet is formed by extruding a 100% polypropylene (melt flow rate of 6.0 g/10 mm) and had the following properties:
 thickness 0.050": 150 micron
 film basis weight: 142 g/m$^2$
 STBL: 3200 m
 break elongation: 1400%
 initial modulus: 14500 m
 STBL over seal: 14500 m
 STBL over fold: 3040 m
The bag was heat-sealed and stretched in the apparatus 1.5 times on a lateral direction and 4.5 times on a longitudinal direction (3 passes) to a final dimension of 10.5" wide and 31.5" long. It was noted that the heat-sealed area also stretched. The stretched bag had the following properties:
 thickness: 25 microns
 basis weight: 21 g/m$^2$
 STBL: 35700 (length)
 break elongation: 25%
 initial modulus: 225000 m
 STBL over seal: 18400 m
 STBL over fold: 22050 m

EXAMPLE IV

A 7"×7" double layer sheet is formed by extending a mixture of 95% high density polypropylene (melt flow rate or 2.0 g/10 mm) and 5% titanium dioxide and had the following properties:
 thickness: 200 micron
 film basis weight: 170 g/m$^2$
 STBL: 3800 m
 break elongation: 1800%
 initial modulus: 12000 m
 STBL over seal: 2600 m
 STBL over fold: 2650 m
The bag was heat-sealed and stretched in the apparatus 2.0 times (2 passes) on a lateral direction and 5.0 times on a longitudinal direction (3 passes) to a final dimension of 14.0" wide and 25" long. It was noted that the heat-sealed area also stretched. The stretched bag had the following properties:
 thickness: 22 microns
 basis weight: 18 g/m$^2$
 STBL: 38500 m
 break elongation: 40%
 initial modulus: 17500 m
 STBL over seal: 28500 m
 STBL over fold: 30400 m Thus, it is readily apparent to one skilled in the art that a novel bag is produced of a light weight per dimension exhibiting substantially improved strip tensile breaking length. It will be readily apparent to one skilled in the art that depending on end use, that a bag of improved strip tensile breaking length may be produced by passing a tubularly-formed thermoplastic sheet, preferably heat-sealed, either through laterally or longitudinally grooved rollers or sequentially through such grooved rollers or as described herein with reference to the preferred embodiment.

While the invention has been described in connection with an exemplary embodiment thereof, it will be understood that many modifications will be apparent to those of ordinary skill in the art and that this application is intended to cover any adaptations or variations thereof. Therefore, it is manifestly intended that this invention be only limited by the claims and the equivalents thereof.

I claim:

1. A process for manufacturing tubularly-shaped thermoplastic products of improved strip tensile breaking strength from an orientable thermoplastic material, which comprises:
   (a) forming said thermoplastic material into a tubularly-shaped film;
   (b) forming said tubularly-shaped film into a sheet;
   (c) heat sealing said sheet at preselect intervals substantially perpendicularly to the movement of said sheet;
   (d) introducing said sheet on step c into a nip of interdigitating rollers having grooves substantially parallel to the axis of said rollers;
   (e) controlling the velocity of introduction of said sheet into said nip to assume and maintain the velocity substantially identical to the surface velocity of said rollers to prevent slipping of said film and thereby longitudinally stretch incremental portions of said sheets by a deflection of said sheet into the shape of said grooves:
   (f) withdrawing said sheet from said rollers at a velocity greater than the rotational velocity of said roller; and
   (g) collecting the thus stretched sheet.

2. The process as defined in claim 1 wherein the withdrawal velocity of step f) is not greater than a factor of the draw ration of said nip of said interdigitating rollers.

3. The product produced by the process of claim 1.

4. A process for manufacturing tubularly-shaped thermoplastic products of improved strip tensile breaking strength from an orientable thermoplastic material, which comprises:
   (a) forming said thermoplastic material into a tubularly-shaped film;
   (b) forming said tubularly-shaped film into a sheet;
   (c) heat sealing said sheet at preselect intervals substantially perpendicularly to the movement of said sheet;
   (d) introducing said sheet of step c) into a nip of interdigitating rollers having grooves substantially perpendicular to the axis of said rollers;
   (e) controlling the velocity of introduction of said sheet into said nip to assume and maintain the velocity substantially identical to the surface velocity of said rollers to prevent narrowing of said film prior to introduction thereby to laterally stretch incremental portions of said sheet by deflection of said sheet into the shape of said grooves;
   (f) laterally elongating and withdrawing said sheet from said rollers at a velocity substantially corresponding to the velocity of introduction; and
   (g) collecting the thus stretched sheet.

5. The product produced by the process of claim 4.

6. A process for manufacturing tubularly-shaped thermoplastic products of improved strip tensile breaking strength from an orientable thermoplastic material, which comprises:
   (a) forming said thermoplastic material into a tubularly-shaped film;
   (b) forming said tubularly-shaped film into a sheet;
   (c) heat sealing said sheet at preselect intervals substantially perpendicularly to the movement of said sheet;
   (d) introducing said sheet of step c) into a nip of interdigitating rollers having grooves substantially parallel to the axis of said rollers;
   (e) controlling the velocity of introduction of said sheet into said nip to assume and maintain the velocity substantially identical to the surface velocity of said rollers to prevent slipping of said film and thereby longitudinally stretch incremental portions of said sheet by a deflection of said sheet into the shape of said grooves:
   (f) withdrawing said sheet from said rollers at a velocity greater than the rotational velocity of said rollers;
   (g) introducing said longitudinally stretched sheet into a nip of interdigitating rollers having grooves substantially perpendicular to the axis of said rollers;
   (h) controlling the velocity of introduction of said sheet into said nip to assume and maintain the velocity substantially identical to the surface velocity of said rollers to prevent narrowing of said film prior to introduction thereby to laterally stretch incremental portions of said sheet by deflection of said sheet into the shape of said grooves;
   (i) laterally elongating and withdrawing said sheet from said rollers at a velocity substantially corresponding to the velocity of introduction; and
   (j) collecting the bi-axially stretched sheet.

7. The process as defined in claim 6 wherein steps d) to i) are again repeated prior to j).

8. The process as defined in claim 6 wherein steps g) to i) are twice repeated to step j).

9. The product produced by the process of claim 6.

* * * * *

UNITED STATES PATENT OFFICE
CERTIFICATE OF CORRECTION

Patent No. 4,251,585             Dated   February 17, 1981

Inventor(s)    Echard C.A. Schwarz

It is certified that error appears in the above-identified patent and that said Letters Patent are hereby corrected as shown below:

Col 3, line 67, "Scaled" should be -- sealed --;

Col. 4, line 3, "scaled" should be -- sealed --;

Col. 4, Under Example IV:
    line 47, "or" should be -- of --;

Col. 5, Claim 1,
    line 31, "on" should be -- of --;

Signed and Sealed this

Twenty-ninth Day of September 1981

[SEAL]

*Attest:*

*Attesting Officer*

GERALD J. MOSSINGHOFF

*Commissioner of Patents and Trademarks*